United States Patent [19]
Bivens

[11] 3,812,550
[45] May 28, 1974

[54] VEHICLE WASHING APPARATUS
[75] Inventor: David J. Bivens, Danville, Va.
[73] Assignee: Bivens Winchester Corporation, Ann Arbor, Mich.
[22] Filed: Feb. 16, 1973
[21] Appl. No.: 333,441

[52] U.S. Cl. .................... 15/21 E, 15/DIG. 2, 15/53
[51] Int. Cl. ............................................. B60s 3/06
[58] Field of Search ............ 15/DIG. 2, 21 D, 21 E, 15/53, 97, 98, 49 C, 50 C

[56] References Cited
UNITED STATES PATENTS
| | | | |
|---|---|---|---|
| 1,458,179 | 6/1923 | Hamer | 15/53 |
| 3,693,206 | 9/1972 | Tatara | 15/21 D |

FOREIGN PATENTS OR APPLICATIONS
| | | | |
|---|---|---|---|
| 673,726 | 10/1929 | France | 15/53 |

*Primary Examiner*—Edward L. Roberts

[57] ABSTRACT

A side brush apparatus for washing tall vehicles including a longitudinally displaceable carriage and a pair of independently pivotal cylindrical brushes mounted on the carriage with the axes thereof in spaced, staggered, parallel relationship and inclined from the vertical at an angle of 45° to present a maximum swept washing area for an angled brush at minimum effective longitudinal length.

10 Claims, 2 Drawing Figures

PATENTED MAY 28 1974  3,812,550

3,812,550

VEHICLE WASHING APPARATUS

INTRODUCTION

This invention relates to vehicle washing apparatus and more particularly to an apparatus comprising a staggered arrangement of angled brushes for washing the side surfaces of tall vehicles, such as trucks and buses.

BACKGROUND OF THE INVENTION

Vehicular washing apparatus, particularly of the automatic or semiautomatic type, typically comprises one or more side brushes which are mounted on laterally opposite boundaries of a washing lane for scrubbing the side surfaces of a vehicle in the wash lane moving relative to the brushes. Such brushes are typically mounted in a substantially vertical orientation and are driven about a vertical axis of rotation by means of electric motors. In addition, such side brushes are typically mounted on a pivotal bracket so as to permit the brushes to move inwardly and outwardly relative to the wash lane thereby accommodating vehicles of various widths.

The washing of particularly tall vehicles, such as trucks and buses, has been accomplished in the past through the use of tall, cylindrical brushes mounted with the axes of rotation substantially vertical and on opposite sides of a wash lane. In one example of prior art, a plurality of such brushes are mounted in consecutive side-by-side relationship to perform a repeated washing function on the side surfaces of a tall vehicle, such as a train car.

It has been found that rotary side brushes which are vertically mounted present two problems: first, such brushes do not perform a thorough scrubbing function on a surface having a vertical pattern of surface irregularities, such as vertical ribs or corrugations, this being due to the failure of the bristles to fully engage the interior surfaces of such irregularities as the vehicle translates relative to the scrubbing brush; the second problem arising out of vertical scrubbing brushes is the possibility of damage to vehicle accessories, such as radio antennas. I have found that both of these problems can be solved by disposing the side brush on a substantial angle; i.e., about 45° from the vertical. This approach to the thoroughness and damage problems set forth above, however, creates an additional problem especially in the case of washing apparatus for tall vehicles, in that the longitudinal dimension of a single brush having the necessary swept area becomes very large. Accordingly, the brush reaches prodigious proportions and requires a support structure which occupies a great deal of floor space. The space requirements for such a large brush become particularly troublesome where the washing apparatus is to be mounted inside a building, such as a truck dealership or a bus station, where conditions are typically crowded even without such apparatus. In addition, the single brush approach poses certain problems with respect to economy of manufacture.

BRIEF SUMMARY OF THE INVENTION

In accordance with the present invention a rotary brush type vehicular washing apparatus is provided which is especially adapted for the thorough and safe washing of the side surfaces of tall vehicles, such as trucks and buses, but wherein the washing structure is of minimum longitudinal dimension taken along the washing lane. In general, this is accomplished by means of a vehicle washing apparatus which comprises a vertical support carriage disposed along one lateral boundary of a washing lane and a pair of brushes which are mounted on the carriage in vertically spaced, parallel relation for rotation about the longitudinal axes thereof. The brushes are staggered, i.e., overlapping in horizontal projection, and inclined at an angle of from about 30° to 60° from the vertical thereby to provide a substantial vertical swept area while at the same time reducing the longitudinal dimension of the carriage.

In the preferred embodiment of the invention, the brushes are independently pivotally mounted on the support carriage by means of substantially U-shaped brackets whereby the upper brush may be pivotally displaced through various lateral positions relative to the support carriage independently of the lateral displacement of the lower brush.

The various features and advantages of the subject invention may be best understood by reference to the following detailed description.

DETAILED DESCRIPTION OF THE SPECIFIC EMBODIMENT

Figure 1:
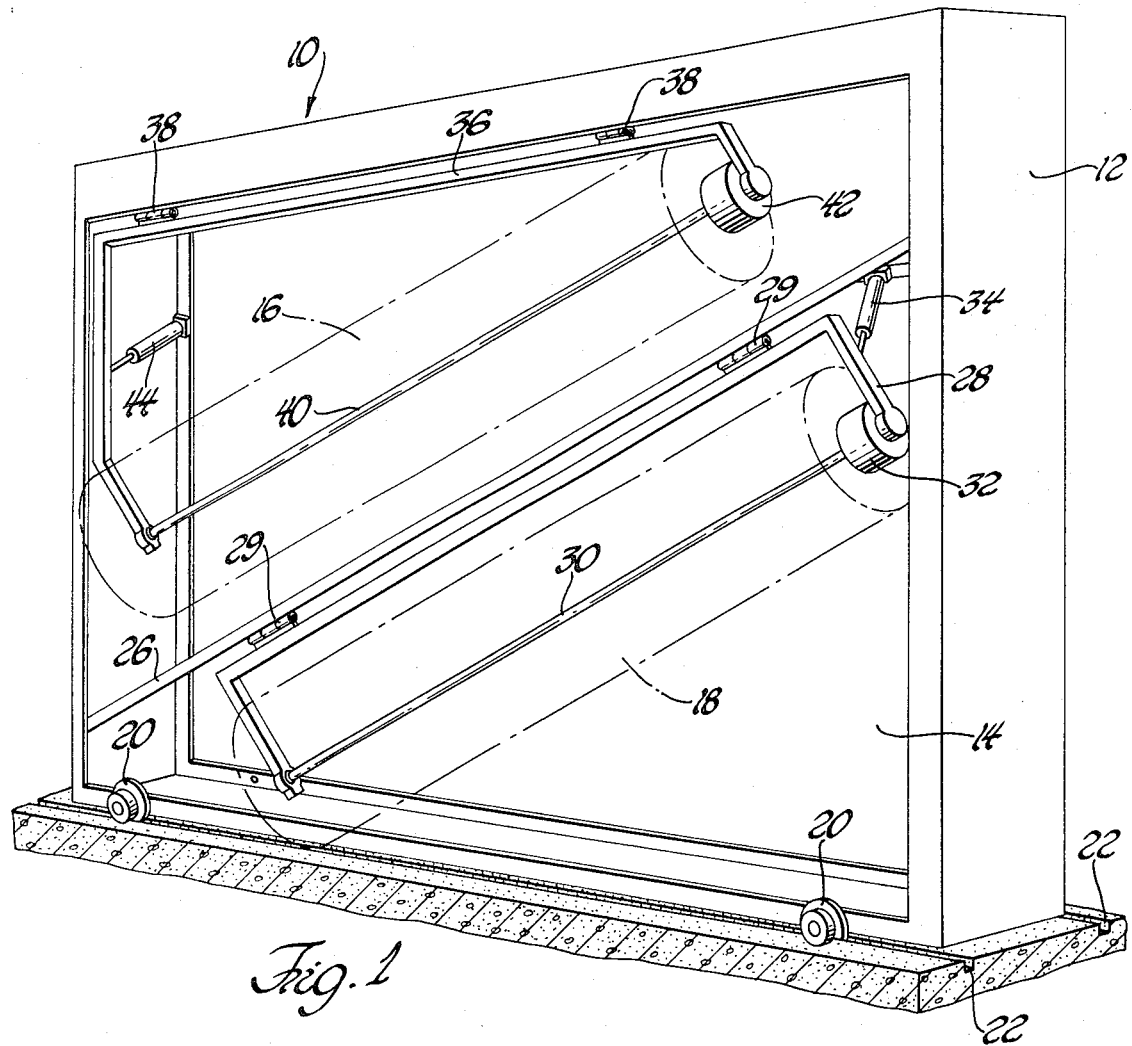
FIG. 1 is a simplified perspective view of an illustrative embodiment to the invention employing a pair of staggered cylindrical side brushes disposed at an angle of 45° from the horizontal; and, FIG. 2 is a schematicized plan view of the apparatus of FIG. 1 illustrating the particular orientation of the brushes and the space savings advantage thereof.

Referring now to FIG. 1, the vehicle washing apparatus 10 which embodies the subject invention is shown to comprise a vertically upstanding, rigid, rectangular framework 12 of sheet metal disposed along and defining one lateral boundary of a vehicular washing lane. The side of the framework 12 which is opposite or external to the washing lane is closed by means of a sheet metal panel 14 while the face immediately adjacent the washing lane is left open to expose the washing surfaces of a pair of cylindrical side brushes 16 and 18 which are mounted on the framework 12 for rotation about the longitudinal axes thereof.

In the embodiment of FIG. 1 the framework 12 takes the form of a longitudinally displaceable carriage having a plurality of wheels 20 which cooperate with tracks 22 in a concrete floor 24 to permit the entire apparatus 10 to be displaced relative to the vehicle being washed. In the typical installation, two apparatuses, such as 10, are employed, one on each lateral boundary of the washing lane and the two carriages are typically interconnected by means of an overhead bridge arrangement so that they are displaced longitudinally together relative to the vehicle being washed. Under these circumstances, the vehicle being washed remains stationary while the washing apparatus in the framework 12 is moved fore and aft. It is to be understood, however, that the present invention is applicable with straightforward modifications to a car washing arrangement wherein the vehicles are towed, pushed, or otherwise propelled through the washing lane and the physical apparatus which performs the washing function remains stationary.

Framework 12 comprises a rigid, diagonal support strut 26 which extends diagonally from the lower left to the upper right side of the rectangular opening, as shown in FIG. 1. Strut 26 supports a U-shaped bracket 28 by means of hinges 29 to permit the cylindrical brush 18 to be pivotally swung about an axis which is parallel to the diagonal strut 26 thereby to permit the brush 18 to be displaced inwardly and outwardly relative to the framework 12 to accommodate vehicles of various widths. U-shaped bracket 28 is typically made of tubular steel having a substantially square cross section and is provided with suitable bearings and other hardware at the upper and lower ends thereof to receive the axle shaft 30 of the brush 18 for rotation about the axis thereof. An electric motor 32 is mounted on the support bracket 28 adjacent the upper end thereof and is energized by means of a suitable circuit including push button or other actuator means as will be apparent to those skilled in the art. The lateral position of brush 18 is controlled by means of a pneumatic cylinder 34 which is mechanically connected between the framework 12 and the support bracket 28 to urge the brush outwardly at a controlled rate and to a selected degree. Again, a suitable control means including direct or automatic displacement control may be employed as will be apparent to those skilled in the art.

Brush 16 is mounted above brush 18 and above the diagonal support strut 26 but with the longitudinal axis thereof parallel to and substantially overlapping the longitudinal axis of brush 18. Brush 16 is carried by a second somewhat modified U-shaped support bracket 36 which in turn is pivotally connected to the top of the framework 12 by means of heavy-duty hinges 38. The bracket 36 is rotatably connected at the opposite ends thereof to the brush shaft 40. A second electric motor 42 is disposed at the upper righthand end of the bracket 36, as shown in FIG. 1, to provide a rotatable drive for the brush 16. In addition, a selectively operable pneumatic cylinder 44 is provided for controlling the lateral position of the brush 16 relative to the framework 12. The pneumatic cylinder 44, like cylinder 34, is mechanically connected between the support bracket 36 and the framework 12. Additional air cylinders may be employed depending upon the size and weight of the brushes and associated apparatus.

Brushes 16 and 18 are preferably of the type having flexible plastic bristles which hang limp when the brushes are stationary but which assume a cylindrical configuration when rotating.

Figure 2:
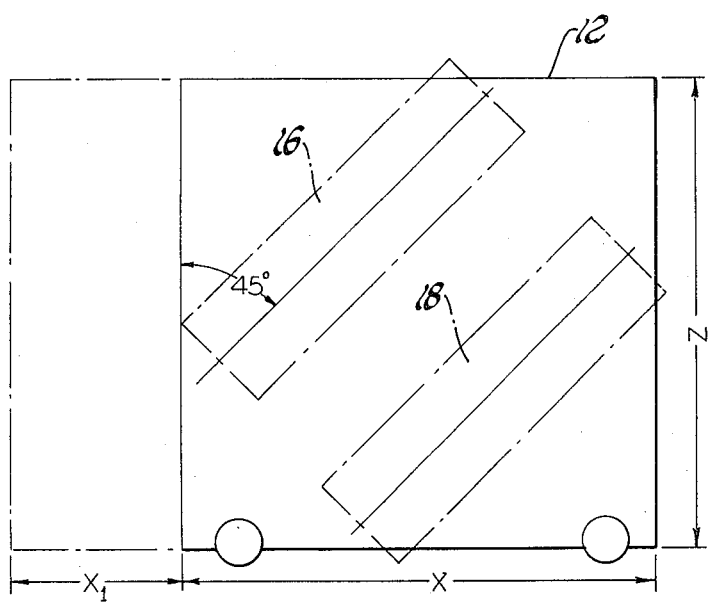

Looking now to FIG. 2, the framework 12 of the support carriage for brushes 16 and 18 is shown schematically to be of a longitudinal length X measured along the washing lane and of a height Z. Brushes 16 and 18 are shown to be mounted on the framework 12 with the axes thereof in spaced, parallel relationship and inclined from the vertical at an angle of 45°. Brushes 16 and 18 are staggered, but substantially overlapping so as to produce a large swept area while at the same time maintaining a minimum longitudinal dimension X. It can be seen in FIG. 2 that the swept area has a height substantially equal to or just exceeding the dimension Z and that to achieve that same swept area with brush 16 alone, for example, would require the framework 12 to be lengthened by the dimension $X_1$. Accordingly, the mounting arrangement of brushes 16 and 18 schematically illustrated in FIG. 2 has the advantages of maximum swept area with minimum longitudinal dimension while at the same time providing the safety and thoroughness of an angled brush arrangement. It has been found that the brushes 16 and 18 may be disposed at various angles of between 30° and 60° from the vertical, the preferred angle being substantially about 45°, as shown in FIG. 2. It will also be noted that the brushes 16 and 18, by virtue of their independent pivotal support brackets 36 and 28, respectively, are individually and independently laterally displaceable relative to the framework 12. Accordingly, the brushes may be adjusted to different lateral positions relative to the framework 12 to accommodate vehicles of varying configurations.

It will be understood that the invention has been described with reference to an illustrative embodiment thereof and that this description is not to be construed in a limiting sense. It will be further understood that the illustrative embodiment, in a typical installation includes certain additional apparatus such as water sprays, water recovery means, air blowers, etc., to fulfill the usual requirements of vehicular washing.

The embodiments of the invention in which an exclusive property or privilege is claimed are defined as follows:

1. Vehicle washing apparatus comprising: a vertical support carriage disposed along and defining one lateral boundary of a washing lane, a pair of cylindrical brushes mounted on the carriage for rotation about the longitudinal axes thereof; and, drive means for rotating said brushes about the axes thereof; said brushes being oriented relative to the carriage with the axes thereof in spaced, parallel relation, overlapping in horizontal projection, and at an angle of about 30° to 60° from the vertical whereby the horizontally swept area of the pair is substantially greater than that of either of the brushes alone while the longitudinal dimension of the carriage along the wash lane is less than that required for a single angled brush of equivalent swept area.

2. Vehicle washing apparatus as defined in claim 1 further comprising mounting means for permitting the brushes to be individually laterally displaced relative to the carriage to engage vehicles of various widths.

3. Vehicle washing apparatus as defined in claim 2 wherein the mounting means comprises for each brush a substantially U-shaped rigid bracket having a longitudinal length slightly greater than the length of a brush, and being secured to a brush at the opposite ends thereof, each such bracket being pivotally mounted on the carriage to permit the associated brush to swing laterally outwardly from the carriage, and control means connected between the brackets and the carriage to control the lateral displacement.

4. Vehicle washing apparatus as defined in claim 1 further including means for permitting the carriage to be displaced longitudinally along the wash lane.

5. Vehicle washing apparatus as defined in claim 1 wherein the angle of orientation of the brushes is substantially 45°.

6. Vehicle washing apparatus as defined in claim 1 wherein the carriage comprises a substantially rectangular framework normally standing in a vertical plane, a face panel closing the side of the framework opposite the wash lane, a rigid support strut extending diagonally across the framework and adjacent the wash lane, a first U-shaped brush support bracket pivotally secured to the support strut and extending below the strut and rotatably carrying one brush to permit one brush to be laterally displaced outwardly from the carriage and into the wash lane, and a second U-shaped brush support bracket pivotally secured to said framework above said strut and carrying a second brush to permit the second brush to be laterally displaced outwardly from the framework into the wash lane independently of said one brush.

7. Vehicle washing apparatus as defined in claim 6 wherein the angle of inclination of the brushes is about 45°.

8. Vehicle washing apparatus as defined in claim 6 wherein the brushes comprise a plurality of flexible bristles and are cylindrical in configuration when rotating.

9. Vehicle washing apparatus as defined in claim 6 including motor means mounted on said brackets for rotating the brushes.

10. Vehicle washing apparatus as defined in claim 6 including wheels on the carriage to permit rolling displacement thereof.

* * * * *